United States Patent [19]

Stubstad et al.

[11] Patent Number: 5,065,958
[45] Date of Patent: Nov. 19, 1991

[54] HELICOPTER SOFT SNOW LANDING AID

[75] Inventors: John M. Stubstad, Dunwoody, Ga.; John H. Rand, Hanover, N.H.

[73] Assignee: The United States of America as represented by the Secretary of the Army, Fort Belvoir, Va.

[21] Appl. No.: 902,712

[22] Filed: Sep. 2, 1986
(Under 37 CFR 1.47)

[51] Int. Cl.5 .............................................. B64C 25/66
[52] U.S. Cl. ................................. 244/17.17; 244/101; 244/108
[58] Field of Search ............... 244/100 R, 100 A, 101, 244/107, 139, 144, 108, 218, 17.17

[56] References Cited

U.S. PATENT DOCUMENTS

| | | | |
|---|---|---|---|
| 997,860 | 7/1911 | Sellers | 244/100 R |
| 1,262,834 | 4/1918 | Norberti | 244/139 |
| 1,748,492 | 2/1930 | Mikula | 244/107 |
| 1,778,906 | 10/1930 | Monjouste | 244/218 |
| 2,493,296 | 1/1950 | Labensky . | |
| 2,621,874 | 12/1952 | Boule . | |
| 2,670,159 | 1/1954 | Barr . | |
| 3,004,737 | 10/1961 | Boyle et al. . | |
| 3,102,705 | 9/1963 | Namsick . | |
| 3,129,909 | 4/1964 | Smith | 244/107 |
| 3,506,222 | 4/1970 | Anderson . | |
| 3,507,466 | 4/1970 | Fleur | 244/17.17 |
| 3,826,449 | 7/1974 | Nelson et al. . | |
| 3,869,103 | 3/1975 | Nelson et al. . | |
| 3,964,698 | 6/1976 | Earl . | |
| 3,990,658 | 11/1976 | Letsinger . | |
| 4,004,761 | 1/1977 | McAvoy . | |

FOREIGN PATENT DOCUMENTS

| | | | |
|---|---|---|---|
| 1756471 | 8/1970 | Fed. Rep. of Germany | 244/218 |
| 1405739 | 9/1975 | United Kingdom | 244/218 |

Primary Examiner—Galen Barefoot
Attorney, Agent, or Firm—Darrell E. Hollis

[57] ABSTRACT

An aircraft landing gear system including a window shaped type membrane which is mechanically stretched prior to landing. The large surface area of the membrane would significantly increase the load bearing area of the helicopter, enabling landing in snow. Upon take-off, the member would be rolled up.

27 Claims, 1 Drawing Sheet

HELICOPTER SOFT SNOW LANDING AID

STATEMENT OF GOVERNMENT INTEREST

The invention described and claimed herein may be manufactured and used by or for the Government of the United States of America for governmental purposes without the payment of royalties thereon or therefor.

BACKGROUND OF THE INVENTION

The invention relates to an aircraft landing device and more particularly to a helicopter landing gear suitable for operation on various types of terrain.

A landing gear in accordance with the present invention is capable of supporting an aircraft on various types of terrain including snow, sand and mud.

Upon normal conditions, an aircraft can be expected to land on a hard surface runway or prepared landing area and a landing gear system is provided for operations under these conditions. This landing system usually adds a weight penalty to the aircraft that cannot economically be eliminated at the present time. Also, the landing gear system for normal landings may produce some aerodynamic drag which is somewhat detrimental in high speed flight. Since all aircraft must be provided with some landing system, the weight penalty and aerodynamic drag associated therewith must be accepted and minimized to the extent possible. However, where aircraft, particularly helicopters, operate over terrain where landing sites cannot be prepared, it is desirable that an auxiliary landing system be provided for buoyantly supporting the aircraft in the event a landing must be made under snow conditions on other than a prepared site.

A further problem exists in the landing of a helicopter in soft snow conditions. If the helicopter settles into the snow, the rotor blade clearance are reduced, making passenger discharge and pickup hazardous and it can lead to the tail rotor striking the snow. The use of skis on helicopters has not always proven to be effective in solving this particular problem.

OBJECTS OF THE INVENTION

Thus, an object of the present invention is to provide a landing gear system for supporting an aircraft on various types of terrain.

Another object of the present invention is to provide a landing gear system for use on various types of terrain wherein any additional weight penalty is minimized.

Still another object of the present invention is to provide a retractable landing gear system for supporting an aircraft on various types of terrain and having a low aerodynamic drag at high speed flight.

Yet another object of the present invention is to provide a landing gear system for helicopter for soft snow conditions so that settling into the snow is eliminated.

SUMMARY OF THE INVENTION

In accordance with the present invention, there is provided a landing gear system for supporting a helicopter under normal conditions and also under snow conditions. A landing system is included as a part of the normal landing gear, thus minimizing any added weight penalty. In addition, the system folds within the normal landing gear in a manner that substantially eliminates any increase of aerodynamic drag over that developed by the normal landing system.

The landing gear system according to this invention comprises a landing aid attached to the skids of a typical aircraft. When necessary for landing on terrain requiring them, a signal provided by the pilot causes membranes from both skids to be stretched across the bottom of the helicopter to increase the bearing surface area of the helicopter. Upon takeoff, the membranes would be retracted into their respective skids. The material of the membranes could vary from open webbing to a KEVLAR material.

A more complete understanding of the invention and its advantages will be apparent from the specification and claims and from the accompanying drawings illustrative of the invention.

DESCRIPTION OF THE PREFERRED EMBODIMENTS

Figure 1A:
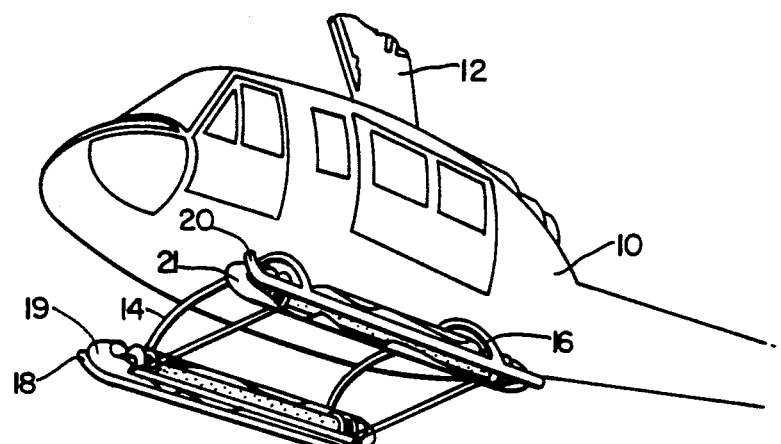
FIG. 1(a) is a bottom front perspective view of a helicopter, partially cutaway, showing the landing gear of this invention for normal landing conditions.

Referring now to the drawings, wherein like represented elements represent identical items throughout the several views, the helicopter shown comprises an elongated fuselage or hull 10 having a pylon housing 11, an engine and the associated gearing required to rotate a lifting rotor 12 about a vertical axis. The tail portion is cutaway for simplicity; it includes an anti-torque rotor in accordance with standard single rotor helicopter design.

The landing gear system comprises a front supporting strut 14 fastened to the fuselage 10 and a rear strut 16 fastened to the fuselage. Trough-like skids 18 and 20 bolted to the lower ends of the struts 14 and 16 and provides support of the helicopter on firm terrain such as a prepared landing site.

Pods 19 and 21, are mounted to the insides of skids 18 and 20, respectively, and located so that they do not touch the ground on hard terrain.

Mounted within pods 19 and 21, and maintained therein unless required, are the auxiliary landing aids of the present invention. Within each of the respective pods 19 and 21, there is placed a material 22 and 24 in a rolled-up condition along the length of the pods. Bars 26 and 28 are attached to the longitudinal edges of materials 22 and 24, respectively. Winch members 40 and 41, mounted in pod 21, are coupled to edge bar member 26 through cables 32 and 30, respectively. Winch members 38 and 39, mounted in pod 19, are coupled to edge bar member 28 through cables 34 and 36, respectively.

Figure 1B:
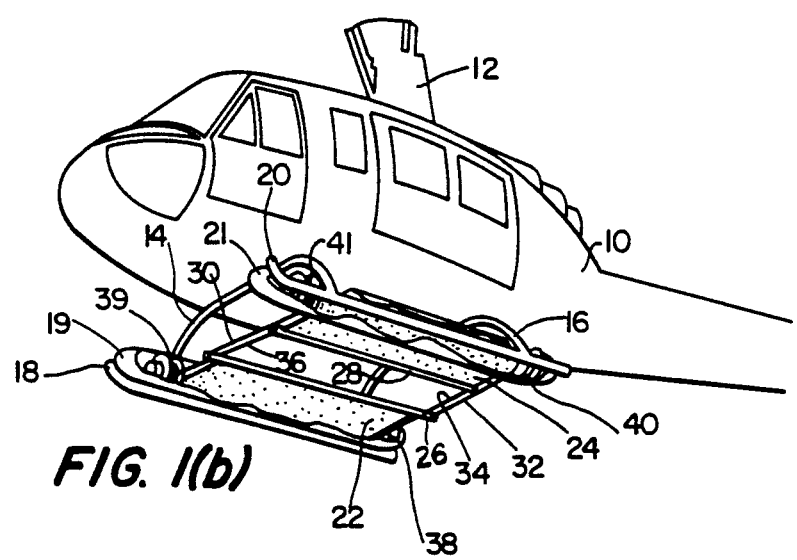
FIG. 1(b) is a bottom front perspective view of the helicopter; showing the auxiliary landing device in its partially deployed position.
Figure 1C:
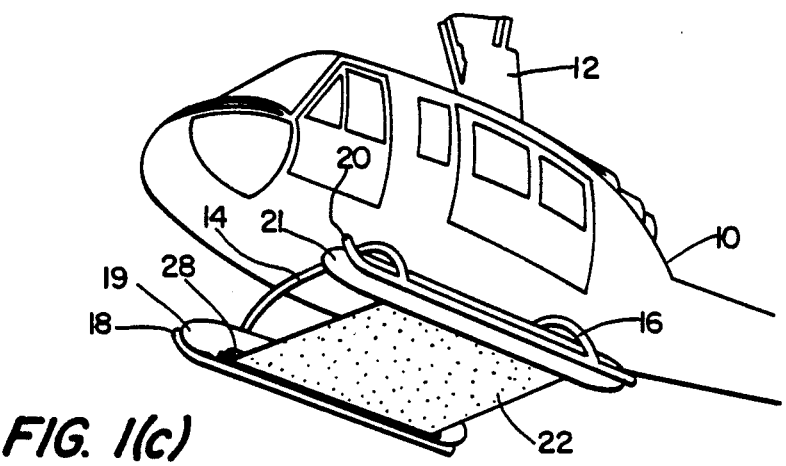
FIG. 1(c) is a bottom front perspective view of the helicopter showing the auxiliary landing device in its fully deployed position.

As shown in FIG. 1(a) the landing aid is in a completely retracted position and self contained. Normally, all landings would take place under the conditions of FIG. 1(a) and the pods 19 and 21 would not touch the surface. Should conditions warrant, and upon deciding to deploy the materials 22 and 24, the helicopter pilot would provide an electronic signal to the winch members 38, 39, 40 and 41 to rotate and withdraw, through their respective cables 32, 30, 34 and 36, their respective materials as illustrated in FIG. 1(b). FIG. 1(c) illustrates the materials in a fully deployed stretched condition.

After landing and takeoff, the materials would be retracted into their respective pods as shown in FIG. 1(a).

Two materials are shown deployed although it is feasible to employ only one from one pod and only a single pair of winches. The use of the two materials 22 and 24 is suggested because of the symmetry believed to be required for proper balance of the aircraft during movement of the materials. When fully deployed, the materials 22 and 24 are pulled tight to the opposite pods, 21 and 19 respectively, providing two layers of materials and increasing the surface contact characteristics of the helicopter 10.

The selection of the materials used in materials 22 and 24 could vary from a canvas, metal, synthetic mesh or open webbing. A solid material, such as KEVLAR may be selected in that it provides limited protection from small arms fire should the helicopter be used in a hostile environment.

Thus, there has been provided a helicopter landing aid for soft snow conditions which is easily installed onto skids of a typical helicopter. The landing aid is self-contained and retractable when not needed and does not detract from helicopter performance during high speed flight. The large surface area of the materials would significantly increase the load bearing area of the helicopter, allowing landing in extremely adverse conditions.

Some of many advantages of the present invention should now be readily apparent. The novel preferred embodiment system affords a relatively simple and thus reliable apparatus for rapidly and positively retracting and folding a landing aft for storage during flight. In addition the apparatus is lightweight, compact and inexpensive, as well as easy to maintain due to its lack of complexity.

Obviously, many modifications and variations of the present invention are possible in light of the above teachings. It is therefore to be understood that within the scope of the appended claims the invention may be practiced otherwise than as specifically described.

What is claimed is:

1. A helicopter landing gear, including a pair of substantially parallel, spaced-apart skids located below the helicopter fuselage, for landing on snow comprising:
   a. a flexible membrane having one portion fixed with respect to a first skid; and
   b. means for pulling an unfixed portion of said flexible membrane to extend the membrane from a retracted position to a deployed position in which said membrane is substantially planer and substantially spans the area between the two skids, when landing on snow said membrane, in its deployed position, provides a load bearing surface for said helicopter.

2. A helicopter landing gear as recited in claim 1, wherein said pulling means comprises at least one winch.

3. A helicopter landing gear as recited in claim 2 wherein said pulling means further comprises an edge bar attached to a free edge of said membrane, and at least one cable coupled between said edge bar and said winch.

4. A helicopter landing gear as recited in claim 3 wherein said membrane comprises KEVLAR.

5. A helicopter landing gear as recited in claim 3 wherein said membrane comprises an open mesh.

6. A helicopter landing gear as recited in claim 1 wherein said membrane is positioned above the lowermost edges of said skids so that the membrane will not sustain wear during landings on non-snow covered surfaces.

7. A helicopter landing aid as recited in claim 1 further including a housing for storing said membrane when in its retracted position.

8. A helicopter soft snow landing aid, comprising:
   a. a helicopter landing gear including a pair of substantially parallel, spaced-apart skids located below the helicopter fuselage,
   b. a flexible, planer membrane positioned to substantially span the area between the skids such that the membrane provides a load-bearing surface for the helicopter when landing on snow-covered surfaces.

9. The apparatus of claim 8 further including means, connected to said landing gear, for storing said membrane being connected therebetween.

10. The apparatus of claim 9 further including means for withdrawing said membrane from said storing means to an operative position.

11. The apparatus of claim 8 wherein one edge of said membrane is fixed with respect to one skid and the opposite membrane edge is fixed with respect to the other skid.

12. A helicopter landing aid as recited in claim 8 wherein said membrane is positioned above the lowermost edges of said skids so that the membrane will not sustain wear during landings on non-snow covered surfaces.

13. A helicopter landing gear, including a pair of substantially parallel, spaced-apart first and second skids located below the helicopter fuselage, for landing on snow covered surfaces, comprising:
   a. first and second flexible membranes each having one portion fixed with respect to respective first and second skids;
   b. means for pulling a free portion of said first and second membranes to extend the first and second membranes from a retracted position to a deployed position in which said first and second membranes are substantially co-planer and substantially span the area within the first and second skids; and
   c. when landing on snow, said first and second membranes, in their deployed position, providing a load bearing surfaces for said helicopter.

14. The apparatus of claim 13 wherein said pulling means includes at least one winch.

15. The apparatus of claim 14 wherein said pulling means further includes first and second edge bars respectively attached to free edges of said first and second membranes, and t least one cable coupled between said first and second edge bars and said winch.

16. The apparatus of claim 15 wherein said first and second membranes are positioned above the lowermost edges of said skids so that the membrane will not sustain wear during landing on non-snow covered surfaces.

17. A helicopter landing aid, comprising:
   a. a flexible membrane;
   b. support means, located below the helicopter fuselage, for said membrane, one portion of said membrane being fixed with respect to said support means; and
   c. means for pulling an unfixed portion of said flexible membrane to extend the membrane from a retracted position to a deployed position in which said membrane is substantially planer, when landing on snow said membrane, in its deployed position, provides a load bearing surface for said helicopter.

18. A helicopter landing aid as recited in claim 17, wherein said pulling means comprises at least one winch.

19. A helicopter landing aid as recited in claim 18 wherein said pulling means further comprises an edge bar attached to a free edge of said membrane and at least one cable coupled between said edge bar and said winch.

20. A helicopter landing aid as recited in claim 17 wherein said membrane comprises an open mesh.

21. A helicopter landing aid as recited in claim 17 wherein said membrane is positioned above the lowermost edges of said helicopter so that the membrane will not sustain wear during landings on non-snow covered surfaces.

22. A helicopter landing aid as recited in claim 17 further including a housing having an airfoil surface for storing said membrane when in its retracted position.

23. A helicopter landing aid as recited in claim 17 wherein said membrane comprises KEVLAR.

24. A helicopter landing aid for landing on snow covered surfaces, comprising:

a. first and second flexible membranes;

b. support means, located below the helicopter fuselage, for said first and second membranes, each said membrane having a portion fixed with respect to said support means;

b. means for pulling a free portion of said first and second membranes to extend the first and second membranes from a retracted position to a deployed position in which said first and second membranes are substantially co-planer; and c. when landing on snow, said first and second membranes, in their deployed position, providing a load bearing surface for said helicopter.

25. The apparats of claim 24 wherein said pulling means includes at least one winch.

26. The apparatus of claim 25 wherein said pulling means further includes first and second edge bars respectively attached to free edges of said first and second membranes, and at least one cable coupled between said first and second edge bars and said winch.

27. The apparatus of claim 24 wherein said first and second membranes are positioned above the lowermost edges of said helicopter.

* * * * *